(12) United States Patent
Wang et al.

(10) Patent No.: US 11,139,650 B1
(45) Date of Patent: Oct. 5, 2021

(54) PRIMARY NODE OF SEAFLOOR OBSERVATORY NETWORK BASED ON CONSTANT CURRENT POWER SUPPLY

(71) Applicant: INSTITUTE OF ACOUSTICS, CHINESE ACADEMY OF SCIENCES, Beijing (CN)

(72) Inventors: Sujing Wang, Beijing (CN); Yonggang Guo, Beijing (CN); Yuankai Zhang, Beijing (CN); Fei Zhang, Beijing (CN); Pu Shi, Beijing (CN); He Qu, Beijing (CN); Guangde Zhang, Beijing (CN); Yanguo Lu, Beijing (CN); Xinyue Zhang, Beijing (CN)

(73) Assignee: INSTITUTE OF ACOUSTICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/277,297

(22) PCT Filed: Dec. 10, 2019

(86) PCT No.: PCT/CN2019/124262
§ 371 (c)(1),
(2) Date: Mar. 18, 2021

(87) PCT Pub. No.: WO2020/147459
PCT Pub. Date: Jul. 23, 2020

(30) Foreign Application Priority Data

Jan. 16, 2019 (CN) .......................... 201910041377.4

(51) Int. Cl.
*H02J 1/04* (2006.01)
*H04L 12/10* (2006.01)
(Continued)

(52) U.S. Cl.
CPC ............. *H02H 7/26* (2013.01); *G02B 6/4446* (2013.01); *H01B 9/005* (2013.01); *H02H 1/0007* (2013.01); *H02J 13/00002* (2020.01)

(58) Field of Classification Search
CPC .... G02B 6/4446; H01B 9/005; H02H 1/0007; H02H 7/26; H02J 13/00002; H02J 3/22;
(Continued)

(56) References Cited

U.S. PATENT DOCUMENTS

| | | | |
|---|---|---|---|
| 9,379,544 B2 * | 6/2016 | Hazel | H02J 13/0006 |
| 2012/0247809 A1 * | 10/2012 | Stewart | F03B 13/16 174/135 |
| 2015/0009735 A1 * | 1/2015 | Boe | H02M 5/16 363/164 |

FOREIGN PATENT DOCUMENTS

| | | | |
|---|---|---|---|
| CN | 106602524 A | | 4/2017 |
| CN | 107093894 A | | 8/2017 |

(Continued)

OTHER PUBLICATIONS

Bruce M. Howe, "Power Systems for Ocean Regional Cabled Observatories"; ResearchGate [online] www.researchgate.net [retrieved on Dec. 2004]. Retrieved from the Internet: <URL:https://www.researchgate.net/publication/4130060_Power_systems_for_ocean_regional_cabled_observatories> (Year: 2004).*

(Continued)

*Primary Examiner* — Jared Fureman
*Assistant Examiner* — Nicolas Bellido
(74) *Attorney, Agent, or Firm* — Bayramoglu Law Offices LLC

(57) ABSTRACT

A primary node of a seafloor observatory network based on constant current power supply is provided. The primary node is connected in series to a submarine cable of a backbone network. The primary node is connected to a shore station and an adjacent primary node by submarine cable
(Continued)

terminal boxes, respectively. The primary node includes an underwater power supply and a communication control module. The underwater power supply is used for converting constant current power provided by the shore station into power for the primary node and some backup power, and outputting direct-current constant voltage power for the communication control module, and is further used for controlling the primary node to access and exit from the network. The communication control module is used for monitoring the internal state of the primary node by control system backup, and sending the state information and data to the shore station.

8 Claims, 3 Drawing Sheets

(51) Int. Cl.
  *H02H 7/26* (2006.01)
  *H02J 13/00* (2006.01)
  *G02B 6/44* (2006.01)
  *H01B 9/00* (2006.01)
  *H02H 1/00* (2006.01)

(58) Field of Classification Search
  CPC .. H02J 3/34; H02M 5/12; H02M 5/16; H02M 5/27
  See application file for complete search history.

(56) References Cited

FOREIGN PATENT DOCUMENTS

| | | | |
|---|---|---|---|
| CN | 109713658 A | | 5/2019 |
| CN | 110350969 A | * | 10/2019 |
| CN | 110752580 A | * | 2/2020 |

OTHER PUBLICATIONS

Feng Lü, et al., Power System Structure and Topology Reliability of Cabled Seafloor Observatory Networks, Journal of Tongji University (Natural Science), 2014, pp. 1604-1610, vol. 42, No. 10.

Wei-Jing Yu, et al., Study on Power Management and Control System for Ocean Cabled Observatory, Machinery Design and Manufacture, 2013, pp. 252-255, No. 5.

\* cited by examiner

Fault mode 1

Fault mode 2

Fault mode 3

PRIMARY NODE OF SEAFLOOR OBSERVATORY NETWORK BASED ON CONSTANT CURRENT POWER SUPPLY

CROSS REFERENCE TO THE RELATED APPLICATIONS

This application is the national phase entry of International Application No. PCT/CN2019/124262, filed on Dec. 10, 2019, which is based upon and claims priority to Chinese Patent Application No. 201910041377.4, filed on Jan. 16, 2019, the entire contents of which are incorporated herein by reference.

TECHNICAL FIELD

The present invention relates to the technical field of Seafloor Observatory Network, and specifically to a primary node of the Seafloor Observatory Network based on constant current power supply.

BACKGROUND

Marine scientific research is experiencing a change from transient observations at the sea surface to long-term continuous observations inside the seafloor. The Seafloor Observatory Network is a novel ocean observation method using the seafloor remote communication technology, which is realized by connecting the shore station power supply and communication equipment upward and various seafloor observation instruments downward through submarine cable, primary nodes, repeaters and other equipments, thereby realizing high-power continuous power supply to the seafloor observation instruments and real-time online acquisition of observation data. The submarine cable adopts the traditional seafloor optic-electrical composite cable with a single-pole copper conductor and a multi-core optical fibers to provide fiber optic communication and power supply link; the seafloor primary node is the hub equipment for electric energy conversion, operation control and data communication, providing the required medium and low voltage electric energy for the seafloor observation instruments by electric energy conversion, and providing real-time data transmission, precise timing and state control for different observation instruments on the seafloor. Therefore, the Seafloor Observatory Network has incomparable advantages compared with traditional ocean observations in terms of high resolution, real-time transmission and long-term continuous in-situ observation, which will fundamentally change human understanding of the ocean.

The existing high-voltage DC (HVDC) transmission technology is divided into two power supply methods: constant voltage parallel connection and constant current series connection. The completed Seafloor Observatory Networks mostly adopt the power supply method of constant voltage parallel connection, that is, the negative high-voltage electric energy of the shore station power supply is output to each seafloor primary node through the unipolar submarine cable, and the external electrode of each seafloor primary node forms an electric energy loop with seawater as a conductor, therefore, each primary node and the submarine cable need to bear high voltage, which proposes high requirements on insulation of the seafloor primary node and the submarine cable, and the constant voltage parallel system has such serious defects that the short-circuit fault of the submarine cable insulation easily leads to paralysis of the power supply of the system. In China, the risk of man-made damage to submarine cables in shallow water is high, and seafloor earthquakes and landslides are frequent in deep water, with a high possibility of short circuit of submarine cables. In view of the high maintenance cost of Seafloor Observatory Network system, the use of constant voltage power supply method will pose a serious challenge to the construction of long-term operational Seafloor Observatory Network in China. In the constant current series power supply method, the shore station power supply is output to each seafloor primary node as a constant current through the unipolar submarine cable, each seafloor primary node is connected in series through the submarine cable, the tail end of the submarine cable is connected to the electrode or the shore station power supply at the other end, and electric energy is also transmitted with seawater as the loop, however, along with electric energy consumption of the Primary Node one by one, the working voltage of the primary node and the submarine cable at the back end is gradually reduced, high voltage does not need to be exerted on all the Primary Node and the submarine cables. In addition, when a short-circuit fault of a submarine cable occurs in constant current power supply, the system will take the short-circuit fault point as the grounding point, and the shore station power supply can ensure continuous operation of the system by adjusting the supply voltage, which has a natural ability in resisting against short-circuit faults and can effectively improve the robustness of the system. Therefore, the constant current series connection power supply method has become an important choice for the design of the power supply system of the Seafloor Observatory Network in China.

The existing seafloor primary node usually does not have the function of fault isolation, the function is realized by a branch unit (BU). For the constant voltage power supply method, the branch unit needs to have three ports, and the three ports are respectively connected to the backbone submarine cable at two ends of the BU and connected to the primary node through the branch submarine cable, and the specific fault isolation is realized as described in the invention patent "Branch Unit Device and Submarine cable Fault Isolation Method for Seafloor Observatory Network System" (201510665879.6), the branch unit enters the fault isolation working mode by adjusting output voltage level or voltage polarity of the PFE in the shore station, and then the internal relays are controlled to perform fault switching and other operations. However, after the constant voltage power supply branch unit enters the fault isolation mode, the Seafloor Observatory Network system needs to be completely shut down, and the operation can be resumed only after the system can be powered normally after completing the fault isolation, which affects the continuity of observation data. The constant current branch unit needs to be designed with four ports, two of which are connected to the backbone submarine cable, and the remaining two ports are respectively connected to two branch submarine cables so that the primary node of constant current power supply is connected to the system in series, thereby greatly increasing the construction difficulty; if the double branch submarine cable type is not adopted, it means that the branch submarine cable is a "one in, one out" dual layered copper conductor submarine cable, and the highest working voltage of the dual-conductor submarine cable adopted by the Japanese DONET seafloor seismic monitoring system (the primary node power consumption is low, no more than 500 W) is 5 kV, but for the large comprehensive Seafloor Observatory Network, due to the large number of connected instruments, the required power is high (tens of kW), the withstand voltage of the dual-conductor submarine cable should be more than 10 kV, thereby greatly reducing the reliability of the dual-conductor submarine cable, although TE SUBCOM Company has proposed a 15 kV dual-conductor submarine cable design solution, no practical cases have been seen in view of high risk of high-voltage insulation breakdown of submarine cables and underwater equipment for the small internal space.

In summary, in order to ensure the long-term reliability of seafloor observation, it is of great importance to design a high-power and highly reliable primary node for comprehensive Seafloor Observatory Network that can overcome the shortcomings that the dual-conductor submarine cable cannot withstand high voltage by using a constant current power supply method.

SUMMARY

Aiming at the shortcomings of the prior art, the present application proposes a primary node of Seafloor Observatory Network based on constant current power supply, which avoids the problems of weak resistance against submarine cable faults and weak robustness of the constant voltage power supply system. The primary node is internally integrated with a branch isolation module to provide branch control and fault isolation for the constant current power supply characteristics of the system, which not only reduces the construction risk and greatly reduces offshore construction volume, but also connects the primary node directly to the submarine cable, thereby eliminating the need for dual-conductor submarine cables and allowing the use of 10 kV-level voltage power supply, which significantly increases the system power and meets the needs of comprehensive Seafloor Observatory Network. In addition, when branch control or isolation control is carried out, the shore station can send instructions to the primary node through the submarine cable, without changing the polarity of the shore-based power supply, thereby ensuring continuous and uninterrupted observation of the Seafloor Observatory Network.

In addition to the above design, in order to ensure high reliability of the primary node, a design solution of redundancy backup of the control system and power supply is proposed, which solves the problem of low reliability of the primary node with single control system and single power system during long-term operation. When one of the main control/power supply fails, it can automatically and quickly switch to the backup main control/power supply, which improves the capability of fast recovery from failure of the primary node; to ensure the power supply safety to the communication control module, an overvoltage/surge suppression unit is designed inside the communication control module; to ensure the power supply safety to the connection port, in addition to branch overcurrent protection/ground fault detection, a special control switch circuit is further designed to ensure the safety of connection of the external instruments to the primary node and the ability of quickly and effectively isolating in the event of a fault. The primary node designed with the above technology can provide long-term and stable electric energy conversion and data communication services for the Seafloor Observatory Network.

In order to achieve the above purpose, the present invention proposes a primary node of Seafloor Observatory Network based on constant current power supply, the primary node is connected in series in a submarine cable of a backbone network; the primary node is connected to a shore station and an adjacent primary node respectively by means of submarine cable terminal boxes; and the primary node includes an underwater power supply and a communication control module;

the submarine cable terminal box is used for optic-electrical separation before the submarine cable is connected to the primary node, a conductive copper in the submarine cable is separated from the optical fibers in the submarine cable terminal box and connected to the underwater power supply separately through the submarine cable core, wherein the submarine cable core adopts the internal core of the backbone submarine cable and can withstand 10 kV-level high voltage; and the optical fibers are connected to the communication control module through the optical fiber cable;

the underwater power supply is used for converting the constant current power supply provided by the shore station into power supply for the primary node and some backup power supply, and outputting direct-current constant voltage power supply for the communication control module, and is further used for controlling the primary node to access and exit from the network;

the communication control module is used for monitoring the internal state of the primary node by means of dual-control system, and sending the state information and data uploaded by the external instruments to the shore station, and is further used for receiving instructions from the shore station for fault isolation when a fault occurs in the internal state.

As an improvement of the above equipment, the underwater power supply includes a branch isolation module and a power conversion module which are interconnected with each other;

the branch isolation module is used for connecting the primary node in series in the backbone submarine cable, controlling the entry and exit of the primary node, and receiving constant current power supply from the shore station;

the power conversion module is used for converting the constant current power supply output by the branch isolation module into constant voltage power supply and some backup constant voltage power supplies, to power the communication control module and external instruments.

As an improvement of the above equipment, the branch isolation module includes: a power taking circuit, a branch switch control unit, two grounding switch circuits, a first relay S1, a second relay S2 and a communication conversion interface;

the power taking circuit is connected in series in the submarine cable of a backbone network for obtaining electric energy from the constant current backbone network; the power taking circuit includes internally a voltage regulator diode D1, a voltage regulator diode D2 and a first capacitor C1; the two voltage regulator diodes are connected back-to-back, and the capacitor C1 is connected in parallel to the two cathodes of the two voltage regulator diodes;

the grounding switch circuit is used for achieving grounding after a fault in the backbone line, and the two grounding switch circuits are the first grounding switch circuit and the second grounding switch circuit; the first grounding switch circuit includes a fourth relay S4 and a first absorption resistor R1 connected in series and then in parallel with a third relay S3; and the second grounding switch circuit includes a sixth relay S6 and a second absorption resistor R2 connected in series and then in parallel with a fifth relay S5;

the first relay S1 and the second relay S2 are connected in parallel with the power conversion module to the backbone network, and the first relay S1 and the second relay S2 are used for isolating the primary node when the primary node fails; at the initial moment when the branch isolation module is connected to the submarine cable of a backbone network, the third relay S3 is in a closed state, the first relay S1, the second relay S2, the fourth relay S4, the fifth relay S5 and the sixth relay S6 are in a open state, and the submarine cable of a backbone network forms a closed current loop with seawater through the power conversion module and the third relay S3;

the branch switch control unit is connected to the power taking circuit for supplying power to the inside of the branch isolation module, and switching the six relays;

the branch switch control unit includes an isolated DC/DC power supply, a switching control circuit, a step-down filter circuit, a microcontroller circuit, a voltage/current acquisition circuit and an RS485 subunit; the isolated DC/DC power supply is used for converting 12V unstable voltage to 12V stable voltage, with one power supply powering the switching control circuit, and the other power supply powering the microcontroller after passing through the step-down filter circuit, the microcontroller is connected to the voltage/current acquisition circuit and the RS485 subunit respectively, for monitoring the voltage/current of the primary node and for communication with the communication control module, and the output of the microcontroller is connected to the switching control circuit for controlling the switching of the branch switches; and the communication conversion interface is used for realizing the communication between the branch isolation module and the communication control module using RS485 protocol.

As an improvement of the above equipment, the power conversion module includes a first constant current to constant voltage power supply and a second constant current to constant voltage power supply which are identical with and backup to each other and connected in parallel with each other; a first bypass circuit is connected at an input end of the first constant current to constant voltage power supply, the first bypass circuit is a circuit in which a seventh relay S7 is connected in series with a third resistor R3 and then in parallel with a third capacitor C3, and a second bypass circuit is connected at an input end of the second constant current to constant voltage power supply, the second bypass circuit is a circuit in which an eighth relay S8 is connected in series with a fourth resistor R4 and then in parallel with a fourth capacitor C4. The first constant current to constant voltage power supply includes a first power conversion control circuit and a first constant current to constant voltage conversion circuit, the 375V DC constant voltage power supply output by the first constant current to constant voltage power supply supplies power to the communication control module; under normal working condition, the first constant current to constant voltage power supply and the second constant current to constant voltage power supply are both in working state, when the first constant current to constant voltage power supply fails, the seventh relay S7 is closed, the first constant current to constant voltage power supply is in a short-circuit state, and the second constant current to constant voltage power supply works normally.

As an improvement of the above equipment, the communication control module internally contains an overvoltage/surge suppression unit, a control unit and a data communication unit;

the overvoltage/surge suppression unit is used for safely processing the power supply voltage output from the power conversion module and then supplying power in two channels to the behind circuits, one channel is sent to the medium and low voltage conversion circuit to be converted to low voltage and then to supply power to the control unit and data communication unit, and the other channel supplies power to the external instrument through the control switch;

the control unit is used for monitoring the internal state of the primary node; controlling the power supply switch of the connection port, and monitoring the current and voltage information of the external instrument port; when the monitoring value exceeds the threshold or ground fault happens, the fault interface is immediately closed through the control switch circuit for fault isolation; and the control unit is also responsible for sending the state of the current primary node to the data communication unit, and taking corresponding operations according to the received control instructions of the shore station; and the data communication unit adopts the data backup method to converge the data uploaded by the connection port and the state data of the primary node obtained by the control unit, sends the data to the shore station via optical fiber; and receives the corresponding control instructions sent by the shore station and then sends the control instructions to the control unit for response.

As an improvement of the above equipment, the control unit includes: an RS485 bus switch, an RS485 bus, a first control system board and a second control system board connected via an SPI bus, an I2C bus, an I2C bus switch and a number of control switches;

the RS485 bus switch is in communication with the branch isolation module for monitoring the voltage, current, temperature and ballasting information of the primary node;

the first control system board and the second control system board serve as a backup to each other; when the first control system board is in a working state, the second control system board is in a monitoring state, and both of them transmit the working state information through an SPI bus to each other, the first master control board in the working state is used for sending the state information of the current primary node to the data communication unit and receiving the control instructions from the shore station, and is also used for sending the heartbeat signal to the second master control board regularly. Once the second control system board fails to detect the heartbeat signal, it enters the work switching state, at this time, the first control system board is disconnected from the I2C bus and the RS485 bus, and the second control system board is connected to the I2C bus and the RS485 bus, and the second control system board replaces the first control system board to achieve communication and control of external instruments and branch isolation module through the I2C bus and the RS485 bus, at the same time, the second control system board transmits fault information to the shore station through the data communication unit and executes relevant fault isolation or repair operations according to the instructions issued by the shore station, and automatically enters the monitoring state and becomes a backup board after the first control system board is repaired;

the I2C bus is used for the communication between the control system board and the control switch for the external instruments;

the control switch is used for controlling the access of the external instrument to the primary node, and adopts IGBT and electromagnetic relay series connection to achieve the control of control switch of the external instrument, the control switch is also connected to the current, voltage, temperature monitoring circuit to monitor the working state of the external instrument, timely takes measures for isolation when the power supply state of the connection port is abnormal, and can send the current state to the shore station for state monitoring.

As an improvement of the above equipment, the data communication unit includes: a data backup subunit, two identical data transmission subunits and a wave combining/splitting subunit; the data transmission subunit includes: a switch and a photoelectric converter; the data uploaded by external instruments are transmitted to two switches respectively after 1:1 backup by the data backup subunit, and are converted photoelectrically and then enter the wave combining/splitting subunit for wave combining, and the optical signal after wave combining is sent to the shore stations at two ends simultaneously.

As an improvement of the above equipment, when the branch isolation module obtains through the communication interface of the communication control module that the working state of the primary node is abnormal or cannot be communicated, or when the branch isolation module detects through the voltage/current acquisition circuit that the electric energy consumed by the current primary node is abnormal, the branch isolation module will actively cut off the electrical energy supply to the current primary node, such that the current on the submarine cable of a backbone network is switched to the first relay S1 and the second relay S2, thus disconnecting the connection between the current primary node and the submarine cable of a backbone network; and when the bypass relay of the power conversion module is closed, the internal power conversion module of the primary node is in a short-circuit state, at this time, once the electric energy consumed by the current primary node is detected as zero through the voltage/current acquisition circuit, the branch isolation module actively closes the first relay S1 and the second relay S2, and cuts off the supply of electric energy from the submarine cable to the primary node.

As an improvement of the above equipment, the first primary node and the second primary node are connected in series with each other, when a short circuit or a low resistance fault occurs between the submarine cable connected to the first primary node and the seawater, the data communication units within the communication control modules of the first primary node and the second primary node will each receive a switching instruction sent by the shore station to achieve fault isolation, then the data communication units send the instruction to the control unit, and the control unit will then transmit the instruction to the branch isolation module through the respective RS-485 bus switch, the fourth relay S4 in the first primary node will firstly close, so that the backbone network current on the left side of the fault point will pass through the fourth relay S4 to form a loop, the instantaneous discharge current generated by the distributed capacitor between the submarine cable and the seawater ground will be absorbed by the first absorption resistor R1, and when the discharge is finished, the first absorption resistor R1 is in a short-circuit state through closing the third relay S3, and the fourth relay S4 is controlled to be disconnected; the sixth relay S6 of the second primary node is closed, so that the backbone network current on the right side of the fault point passes through the sixth relay S6 to form a loop, and the instantaneous discharge current generated by the distributed capacitor between the submarine cable of a backbone network and the seawater ground will be absorbed by the second absorption resistor R2, and when the discharge is finished, the second absorption resistor R2 is in a short-circuit state through closing the fifth relay S5, and the sixth relay S6 is controlled to be disconnected.

The present invention has the following advantages and beneficial effects:

1. The present invention proposes a primary node of Seafloor Observatory Network based on constant current power supply, avoiding the problems of weak resistance against submarine cable failure and poor robustness of the primary node of constant voltage power supply type observatory network;

2. Different from the existing design mode in which the current primary node and the branch unit device are independent of each other, in the present invention, the branch control and the primary node are integrated into one design, and the branch isolation module is integrated inside the primary node, then only part of the space of the underwater power supply needs to be occupied, and no dual-conductor submarine cable needs to be used. The present design is simple in structure and small in occupied size, and can reduce the cost and time of construction at sea while reducing the hardware cost;

3. The present invention realizes real-time control of the branch system by the shore station through communication between the communication control module and the underwater power supply, and the electrical power supply of the observatory network does not need to be suspended when the branch module is switched, such that the observation network can operate continuously without interruption;

4. In order to ensure reliability of the primary node, the present invention also designs the backup circuit of power supply and control system, and fully considers the protection function of the control circuit of the external port, and the design of the primary node provides sufficient redundancy design and transient protection mechanism on the whole, thereby ensuring long-term reliable operation of the primary node.

DETAILED DESCRIPTION OF THE EMBODIMENTS

Figure 1:
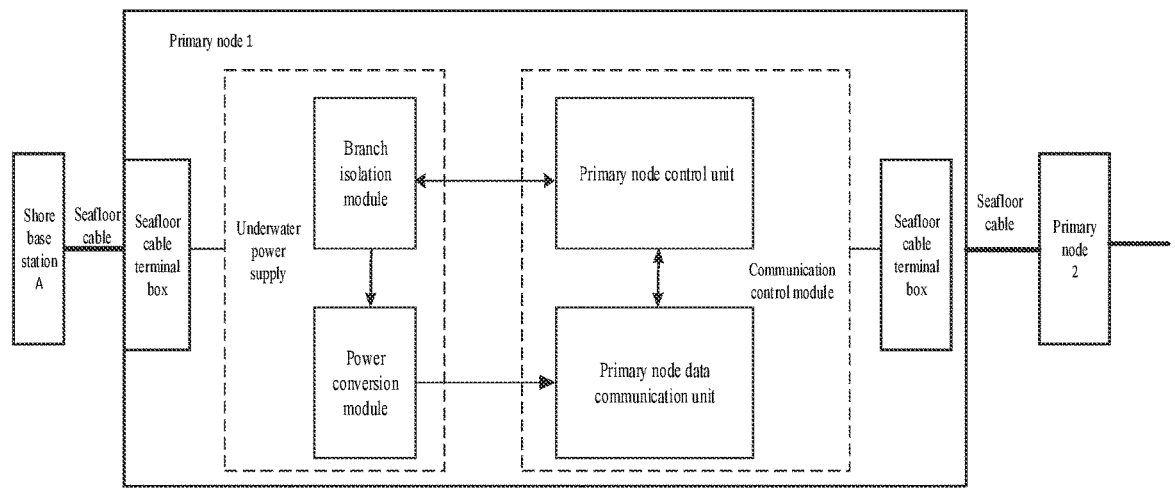
FIG. 1 is a schematic diagram of a primary node of a Seafloor Observatory Network based on constant current power supply of the present invention.

A brief description will be given below on the present invention in combination with accompanying drawings and specific embodiments.

The technical solution adopted in the present invention is a primary node of a Seafloor Observatory Network based on constant current power supply. The primary node of the Seafloor Observatory Network based on constant current power supply is connected in series to the backbone submarine cable and obtains constant current electric energy from the submarine cable. The primary node is mainly composed of an underwater power supply, a communication control module, a submarine cable terminal box, etc. The underwater power supply is composed of a branch isolation module and a power conversion module, and the communication control module internally contains a control unit and a data communication unit. The underwater power supply is connected to the communication control module through a watertight connection assembly, and the underwater power supply delivers the output power supply of the power conversion module to the communication control module for use through the cable, while the RS485 data line is integrated inside the cable, and the control module is communicated with the branch isolation module inside the underwater power supply through the cable, and the data communication unit is responsible for the uploading of data and the reception of such shore-based instructions as branch switching instructions.

The submarine cable terminal box is responsible for the photoelectric separation of the submarine cable before the submarine cable is connected to the primary node, due to the constant current series connection structure, a total of two submarine cable terminal boxes are required, the specific design is as follows: the conductive copper body in the submarine cable is separated from the optical fiber in the submarine cable terminal box, and is separately connected to the underwater power supply through the submarine cable core, and the submarine cable core uses the internal core of the backbone submarine cable and can withstand 10 kV-level high voltage; and the optical fiber is connected to the communication control module through the fiber optic cable, and is connected to the data communication unit inside the communication control module. Specifically:

1. The branch isolation module includes:

a power taking circuit, a branch switch control unit, two grounding switch circuits, a first relay S1, a second relay S2 and a communication conversion interface;

the power taking circuit is connected in series in the submarine cable of a backbone network for obtaining electrical energy from the constant current backbone network; the power taking circuit internally includes a voltage regulator diode D1, a voltage regulator diode D2 and a first capacitor C1; two voltage regulator diodes are connected back-to-back and the first capacitor C1 is connected in parallel to the two cathodes of the two voltage regulator diodes;

the branch switch control unit is connected to the power taking circuit for supplying power to the inside the branch isolation module, and is used for controlling the connected relay switch;

the grounding switch circuit is used for realizing the grounding of the backbone line after a fault, and adopts a voltage-current absorption structure to avoid the problem of current overshoot when the relay is closed and the arcing problem when the relay is disconnected. Two grounding switch circuits are the first grounding switch circuit and the second grounding switch circuit; the first grounding switch circuit includes the fourth relay S4 and the first absorption resistor R1 connected in series, and then is connected in parallel with the third relay S3; the second grounding switch circuit includes the sixth relay S6 and the second absorption resistor R2 connected in series, and then is connected in parallel with the fifth relay S5:

the first relay S1 and the second relay S2 are connected in parallel with the power conversion module to the backbone line, and the first relay S1 and the second relay S2 are used for achieving isolation of the faulty primary node.

The communication conversion interface realizes the communication between the branch isolation module and the communication control module, and usually adopts an RS485 protocol.

2. The power conversion module is connected to the backbone submarine cable of the observation network, converts the constant current electric energy from the backbone submarine cable into constant voltage electric energy to power the scientific observation instrument. Its core component, the constant current and constant voltage conversion circuit, converts the 1 A constant current power in the submarine cable of a backbone network into 400V constant voltage power supply to supply power to the communication control module and the external instrument.

3. The control unit is responsible for monitoring the basic information inside the primary node, such as power supply, temperature, cabin pressure and other information; is responsible for controlling the power supply switch of the connection port, monitoring the current, voltage and other information of the external port, wherein when the monitoring value exceeds the threshold voltage or ground fault, the fault interface is immediately closed through the control switch circuit for fault isolation; and is responsible for sending the state information of the current primary node to the shore station through the submarine cable, and taking corresponding operations according to the received control information of the shore station.

4. The data communication unit is responsible for communicating with the shore station, which can converge the data uploaded by the external instrument or the seafloor observation instrument and send them to the shore station through optical fiber; similarly, the shore station will send the corresponding control instructions to the data communication unit through optical fiber, and the data communication unit will send the relevant instructions to the control unit for response.

The present application proposes the following implementation of a primary node: the power conversion module is internally designed with dual power supplies, and the two power supplies are connected in the way of "series connection input and parallel connection output", then when one of the power supplies has an open-circuit fault, it will automatically switch to the other power supply to supply power to the primary node; the addition of the bypass circuit makes it possible to quickly bypass the power supply when a short-circuit fault occurs to the power supply, thereby simplifying the fault isolation mode. The control unit of the communication control module of the primary node is designed with dual master control, and the SPI bus is responsible for transferring the state information of the control system board A and the control system board B. When an abnormality occurs, switching between the faulty control system board and the backup control system board is performed, and the fault information is transmitted to the shore station through the data communication unit. Meanwhile, the wavelength and path of the data uploaded by the connection port are doubly backed up, thereby greatly improving reliability of data transmission. In addition, an I2C bus switch is further arranged for power supply control of the connection port, and an RS485 bus switch is arranged for communication with the branch isolation module. The above backup redundancy design ensures that when one of the master/power supply fails, automatic and quick switching to the backup master/power supply can be realized.

In the present application, an overvoltage/surge suppression unit is added inside the control unit, which can avoid damage to the control module caused by surges generated by the submarine cable or underwater power supply; in order to solve the problems of overcurrent and ground fault that may occur when the primary node supplies power to the connection port, an external port control switch is designed, a manner in which the IGBT is connected in series to the relay is adopted to achieve rapid isolation of ground fault; the external port switch is subjected to soft-start design, thereby avoiding damage to the primary node and the back-end load caused by surges generated at the moment of power-up, meanwhile, the current, voltage and temperature of the output port of the power supply branch are monitored, then corresponding isolation measures can be taken immediately in case of over current or over voltage.

The present invention relates to the technical field of deep sea observation technology, specifically to the design of a primary node of Seafloor Observatory Network based on constant current power supply.

FIG. 1 is a structural schematic diagram of a primary node of the Seafloor Observatory Network based on constant current power supply, the whole Seafloor Observatory Network adopts the manner of constant current power supply, the primary node mainly includes an underwater power supply, a communication control module and a submarine cable terminal box, wherein the inner part of the underwater power supply consists of a branch isolation module and a power conversion module, the inner part of the communication control module contains a primary node control unit and a data communication unit. The underwater power supply and the communication control module are connected by a watertight connection assembly, and the cable can transmit the medium voltage electricity output from the power conversion module to the communication control module, and the RS485 transmission line is integrated inside the cable, and the primary node control unit can control the branch isolation module inside the underwater power supply. The submarine cable terminal box is responsible for the photoelectric separation of the submarine cable before the submarine cable is connected to the primary node, due to a constant current series connection structure, a total of two submarine cable terminal boxes are required, the specific design is as follows: the conductive copper body in the submarine cable is separated from the optical fiber in the submarine cable terminal box, and is connected to the underwater power supply separately through the submarine cable core, and the submarine cable core uses the internal core of the backbone submarine cable and can withstand 10 kV-level high voltage; the optical fiber is connected to the communication control module through the optical fiber cable, and is connected to the data communication unit inside the communication control module. The constant current source of the shore station delivers electrical energy to each primary node through the backbone submarine cable, and then the branch isolation module in the primary node controls the current on the backbone submarine cable to supply power to other Primary Node. The overall power supply sequence is as follows: the shore station is powered to supply power to the first primary node in the link, the first primary node is connected to the backbone network, and supplies power to the second primary node, and so on until all the Primary Node in the link are normally powered and connected to the backbone network. When a certain master base station on the link fails, the fault can be identified by receiving instructions from the shore station or judging voluntarily and then the faulty master base station is cut out from the backbone network, to ensure that the remaining master base stations can still work normally, thereby realizing the fault isolation of the master base station and improving reliability of the whole observatory network system.

Figure 2:
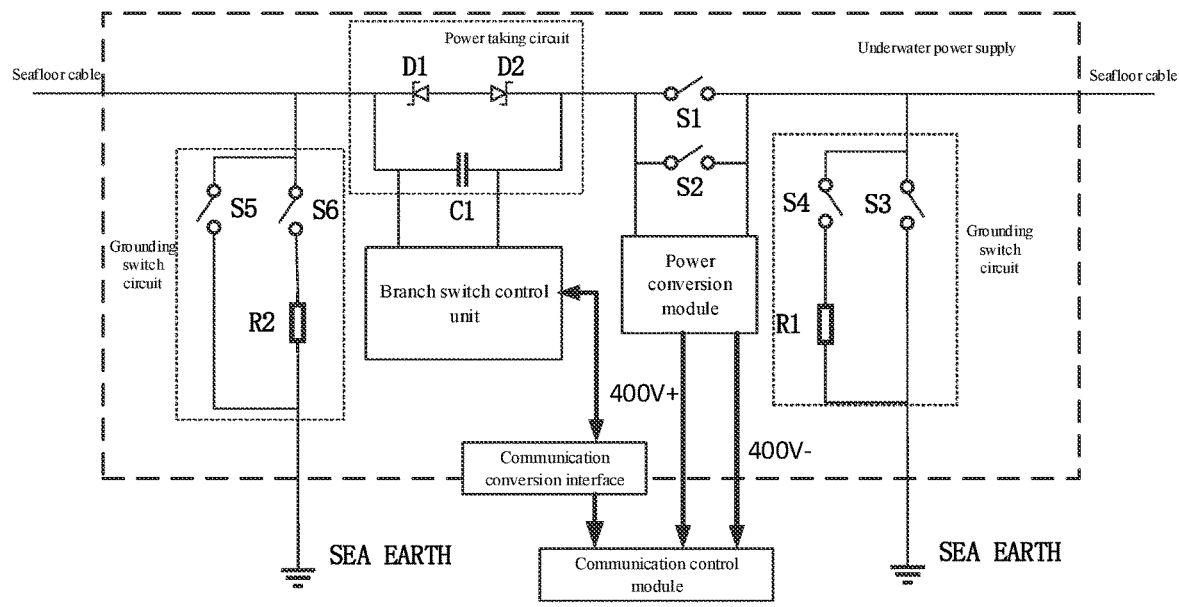
FIG. 2 is a structural block diagram of a branch isolation module in a primary node of the present invention.

FIG. 2 is a structural block diagram of the branch isolation module in the primary node, the process of connecting the branch isolation module to the submarine cable of a backbone network is as follows: at the initial moment of connecting the branch isolation module to the submarine cable of a backbone network, the third relay S3 is closed, the first relay S1, the second relay S2, the fourth relay S4, the fifth relay S5, and the sixth relay S6 are disconnected, and the submarine cable of a backbone network forms a closed current loop with seawater through the power conversion module and the third relay S3. After the normal power supply of the submarine cable of a backbone network, the shore-based power supply provides 1 A constant current electric energy, and the power taking circuit obtains an unstable 12V voltage from the submarine cable of a backbone network, to supply power to the branch isolation module. The power conversion module converts the 1 A constant current power into a stable 400V DC constant voltage power supply to supply power to the communication control module and external instrument; then the branch switch control unit of the branch isolation module controls the third relay S3 to be disconnected, and the constant current power in the submarine cable of a backbone network is transmitted to the next primary node, and the next primary node is connected to the backbone network by repeating the above process.

Figure 3:
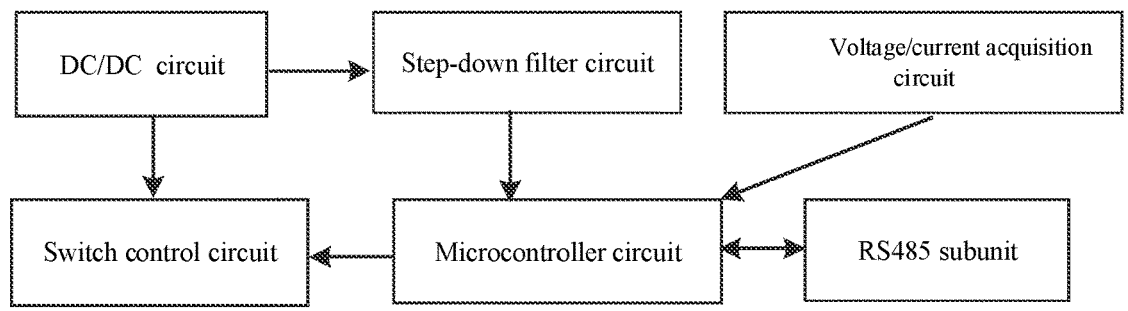
FIG. 3 is a schematic diagram of a branch switch control unit of the present invention.

The control unit is responsible for communicating with the control branch switch control unit inside the underwater power supply. FIG. 3 is a functional block diagram of the branch switch control unit, with the specific working principle being as follows: the 12V unstable voltage obtained from the power taking circuit of the branch isolation module is transmitted to the DC/DC circuit of the branch switch control unit, and the stably output voltage is obtained and sent to the step-down filter circuit, the output of the step-down filter circuit supplies power to the microcontroller circuit, meanwhile, the output of the DC/DC circuit provides working voltage for the relay operated by the switch control circuit. The microcontroller circuit is connected to the voltage/current acquisition circuit, the RS485 subunit, and the switch control circuit, respectively, and the microcontroller circuit obtains the voltage/current when the current primary node is operating through the voltage/current acquisition circuit, so as to isolate the primary node in case of failure.

Figure 4:
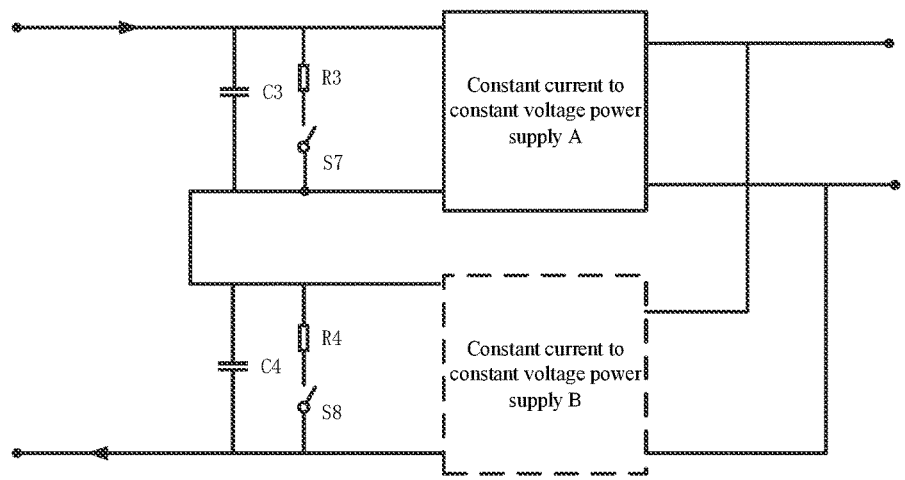
FIG. 4 is a block diagram of a power bypass circuit of the present invention.

As shown in FIG. 4, a bypass circuit composed of normally-closed bypass relays is arranged inside the power conversion module to ensure that the power conversion module will not be in an open-circuit state without drive control. Specifically, the seventh relay S7 is connected in series with the third resistor R3 and then connected in parallel with the third capacitor C3 to the input end of constant current to constant voltage power supply A, and the eighth relay S8 is connected in series with the fourth resistor R4 and then connected in parallel with the fourth capacitor C4 to the input end of constant current to constant voltage power supply B. Under normal working state, both constant current to constant voltage power supplies are in working state, and when the constant current to constant voltage power supply A fails, the seventh relay S7 is closed, the constant current to constant voltage power supply A is in a short-circuit state, the constant current to constant voltage power supply B works normally, and the power supply B is responsible for the power supply of the whole primary node, thereby not only improving the system reliability, but also reducing the maintenance cost of the primary node.

Figure 5:
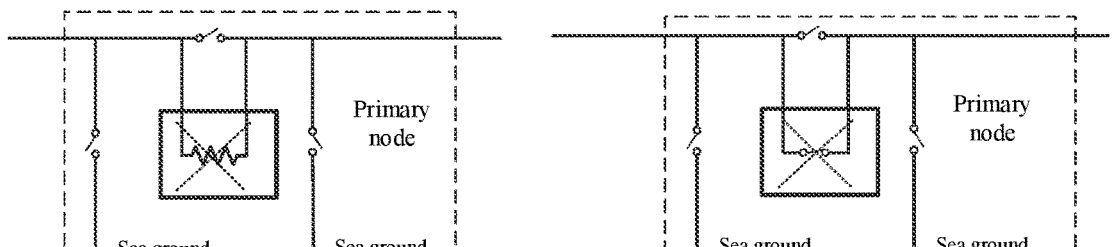
FIG. 5 is a schematic diagram of fault isolation of a branch isolation module of the present invention.
Figure 5:
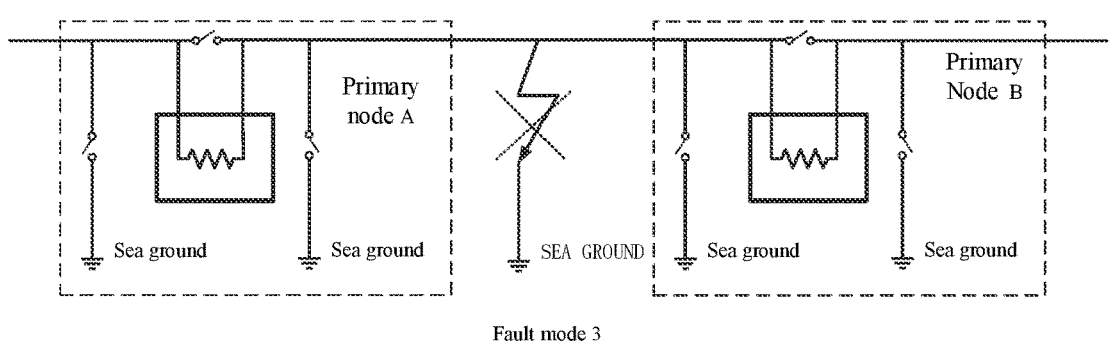

When the primary node or the submarine cable fails, in order to ensure the continuous supply of power to the observatory network, the branch isolation module is required to perform corresponding operations. FIG. 5 shows the fault isolation method adopted by the branch isolation module for the possible fault modes:

1. Fault mode 1:

Under this fault mode, the electric energy supply of the primary node is abnormal, but the primary node is not in the open-circuit state, and the backbone network can still work. The fault mode 1 is determined when the following two conditions occur: the first condition is when the branch isolation module obtains through the communication interface of the communication control module that the working state of the primary node is abnormal or communication cannot be performed; the second condition is when the branch isolation module detects through the voltage/current acquisition circuit that the electric energy consumed by the current primary node is abnormal. Once the fault mode 1 is entered, the branch isolation module actively cuts off the electric energy supply to the current primary node. Specifically, the first relay S1 and the second relay S2 in the branch isolation module are closed, so that the current on the submarine cable of a backbone network no longer flows from the power conversion module but switches to the first relay S1 and the second relay S2, thereby disconnecting the connection between the faulty branch system and the submarine cable of a backbone network, and avoiding further impact on the system caused by the faulty primary node.

2. Fault mode 2

Under this fault mode, the power conversion module inside the primary node is in a short-circuit state since the bypass relay inside the power conversion module is closed, at this time, once the voltage/current acquisition circuit detects that the current electric energy consumption of the primary node is zero, the branch isolation module actively closes the first relay S1 and the second relay S2, to cut off the supply of electric energy to the current connection port.

3. Fault mode 3

Under this fault mode, the primary node works normally, and short circuit or low resistance fault occurs between the submarine cable and seawater between the primary node, at this time, the branch isolation module will isolate the fault point, specifically: the data communication unit in the communication control module of the primary node A and the primary node B will obtain the switching instruction sent by the shore station to achieve fault isolation respectively, and then the data communication unit will send the instruction to the control unit, the control unit will then transmit the instruction to the branch isolation module through their respective RS485, and the branch isolation module will then take the fault branch point cut-out action according to the instruction information, and the specific operation process is as follows: the fourth relay S4 in the primary node A will first close, such that the backbone network current on the left side of the fault point will pass through the fourth relay S4 to form a loop, and the first absorption resistor R1 will absorb the instantaneous discharge current produced by the distributed capacitor between the submarine cable and the seawater ground. In order to avoid loss of electric energy caused when the absorption resistor is connected in series in the submarine cable of a backbone network for a long time, the first absorption resistor R1 is short-circuited by closing the switch of the third relay S3 after the discharge is finished, and the branch control unit controls the fourth relay S4 to be disconnected; the sixth relay S6 of the primary node B is closed, such that the backbone network current on the right side of the fault point forms a loop through the sixth relay S6, and the second absorption resistor R2 absorbs the instantaneous discharge current produced by the distributed capacitor between the submarine cable of a backbone network and the seawater ground. Similarly, to avoid loss of electric energy caused when the second absorption resistor R2 is connected in series in the submarine cable of a backbone network for a long time, the second absorption resistor R2 is short-circuited by closing the fifth relay S5 after the discharge is finished, and the sixth relay S6 is controlled to be disconnected.

Figure 6:
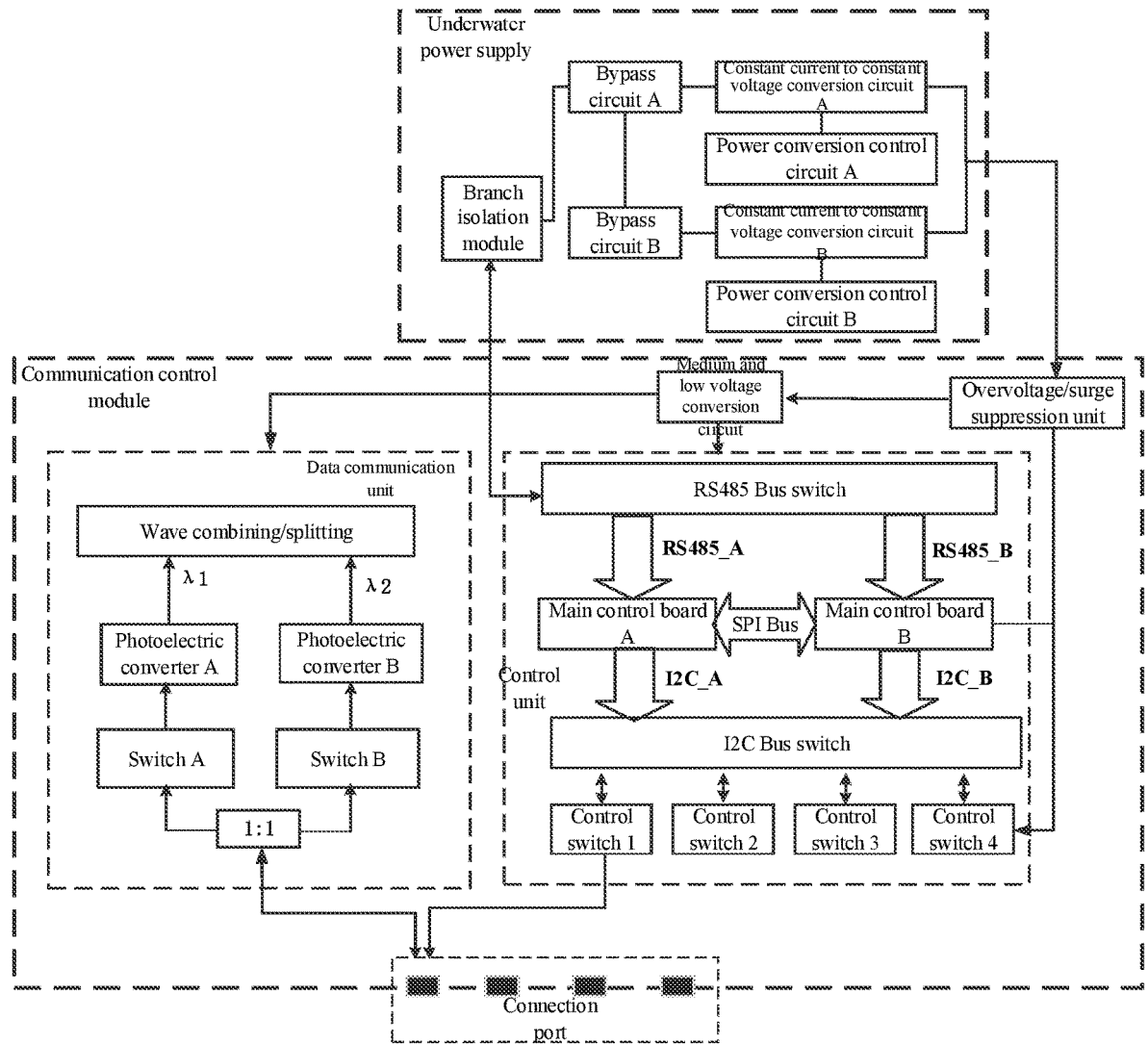
FIG. 6 is a general block diagram of the redundancy backup design of a primary node of the present invention.

FIG. 6 is an overall block diagram of a redundancy backup design for the primary node. The power conversion module internally includes two sets of constant current to constant voltage power supplies which are backup to each other and which consist of a bypass circuit, a constant current and constant voltage conversion circuit, and a power conversion control circuit. The 375V DC constant voltage power supply output after passing through the power conversion module supplies power to the control unit of the primary node. Firstly, the overvoltage/surge suppression circuit performs safety processing on the power supply voltage and then supplies power in two channels to the back-end circuit, one channel is sent to the medium and low voltage conversion circuit to be converted to low voltage and then to supply power to the control unit and the data communication unit, and the other channel supplies power to the external instrument through the control switch. To ensure safety of the whole power supply system, an overcurrent protection/ground fault detection circuit is set up between the control switch and the external port, and the control unit is not only connected with the control switch to control the power supply to the connection port, but also is connected with the current, voltage and temperature monitoring circuit to monitor the working state of the external instrument. When the power supply state of the connection port is abnormal, the control unit can take measures to isolate in time, and can send the current state to the shore station for state monitoring In order to improve the reliability of the whole primary node, a redundancy design of dual master control is carried out within the control unit and the data communication unit, which is implemented as follows.

The control system board A in the control unit is in a working state, and the control system board B is in a monitoring state, both of them pass the working state information through an SPI bus, the control system board A in a working state not only transmits the primary node state information to the shore station through the sea cable and receives the control instruction from the shore station, but also sends the heartbeat signal to the control system board B regularly, once the control system board B cannot detect the heartbeat signal, the control system board B will enter the operation switching state, at this time, the connection between the control system board A and the I2C bus and the RS485 bus is cut off, and the control system board B is connected to the I2C bus and the RS485 bus, the control system board B will control the branch isolation module and the connection port through the I2C bus and the RS485 bus instead of the control system board A, meanwhile, the control system board B will transmit the fault information to the shore station through the submarine cable and perform the relevant fault isolation or repair operation according to the instruction issued by the shore station, the control system board A automatically enters a monitoring state after the control system board A is repaired and becomes a backup board. This dual master control backup redundancy mode can ensure the observatory network service operation without interruption and improve the capability of fast recovery from failure of the primary node.

The data uploaded at the connection port are transmitted to the switch A and the switch B respectively after 1:1 backup, and two channels of data signals are combined after electrical and optical conversion respectively, and the combined optical signals are sent to the shore stations at two ends at the same time, thereby realizing dual redundancy backup of data wavelength and path, and greatly ensuring reliability of data transmission.

The I2C bus of the control unit is responsible for the switching of the connection port control switch. In order to ensure the effective isolation of the connection port fault and the safety of the power supply of the primary node to the external instrument, the present invention adopts series connection between the IGBT and the electromagnetic relays to realize the switch control of the connection port, the relays provide physical isolation without generation of leakage current, thereby avoiding corrosion of the metal cavity of the primary node caused by leakage current; the IGBT has high voltage resistance, fast response speed and no arcing, and can quickly cut off the power supply after a fault occurs. The specific implementation is as follows: when the connection port is powered on, the electromagnetic relay is conducted through the relay control circuit, and then the IGBT is connected through the IGBT control circuit after the electromagnetic relay is stabilized; when the connection port is powered off, the IGBT is first disconnected through the IGBT control circuit, and then the relay is controlled to be turned off, such delayed power-off operation effectively prevents the relay from arcing and jittering, so that the relay can be switched without current, and the electrical life of the relay is prolonged.

Finally, it should be noted that, the above embodiments are merely used for illustrating, rather than limiting, the technical solutions of the present invention. Although the present invention is described in detail with reference to the embodiments, those skilled in the art should understand that, any modification or equivalent substitution of the technical solution of the present invention does not depart from the spirit and scope of the technical solution of the present invention, and shall be encompassed within the scope of the claims of the present invention.

What is claimed is:

1. A primary node of a seafloor observatory network based on a constant current power supply, wherein the primary node is connected in series in a submarine cable of a backbone network;
   the primary node is connected to a shore station and an adjacent primary node by means of different submarine cable terminal boxes; and the primary node comprises an underwater power module and a communication control module;
   a submarine cable terminal box of the different submarine cable terminal boxes is configured for an optical-electric separation before the submarine cable is connected to the primary node;
   a conductive copper in the submarine cable is separated from optical fibers in the submarine cable terminal box and the conductive copper is connected to the underwater power module separately through a submarine cable core, wherein
   the submarine cable core adopts an internal core of a backbone submarine cable and the submarine cable core withstand a 10 kV-level high voltage;
   the optical fibers are connected to the communication control module through an optical fiber cable;
   the underwater power supply is configured for converting the constant current power supply provided by the shore station into a power supply for the primary node and a plurality of backup power, and outputting direct-current (DC) constant voltage power for the communication control module, and the underwater power supply is further configured for controlling the primary node to access and exit from the backbone network;
   the communication control module is configured for monitoring an internal state of the primary node by means of control system backup, and sending state information and data uploaded by an external instrument to the shore station, and the communication control module is further configured for receiving an instruction from the shore station for a fault isolation when a fault occurs in the internal state;
   the underwater power supply comprises a branch isolation module and a power conversion module interconnected with each other;
      the branch isolation module comprises a power taking circuit, a branch switch control unit, two grounding switch circuits, a first relay, a second relay and a communication conversion interface; wherein
         the power taking circuit is connected in series in the submarine cable of the backbone network for obtaining electric energy from a constant current backbone network;
         the power taking circuit comprises internally a first voltage regulator diode, a second voltage regulator diode and a first capacitor;
            the first voltage regulator diode and the second voltage regulator diode are connected back-to-back, and the first capacitor is connected in parallel to two cathodes of the first voltage regulator diode and the second voltage regulator diode;
         the two grounding switch circuits are configured for grounding after the fault occurs in a backbone line, and the two grounding switch circuits are a first grounding switch circuit and a second grounding switch circuit;
            the first grounding switch circuit comprises a fourth relay and a first absorption resistor connected in series and then in parallel with a third relay;
            the second grounding switch circuit comprises a sixth relay and a second absorption resistor connected in series and then in parallel with a fifth relay;
         the first relay and the second relay are connected in parallel with the power conversion module to the backbone network:
         the first relay and the second relay are configured for isolating the primary node when the primary node fails:
         at an initial moment when the branch isolation module is connected to the submarine cable of the backbone network, the third relay is in a closed state, the first relay, the second relay, the fourth relay, the fifth relay, and the sixth relay are in a disconnected state, and the submarine cable of the backbone network forms a closed current loop with seawater through the power conversion module and the third relay;

the branch switch control unit is connected to the power taking circuit for supplying power to an inside of the branch isolation module; and controlling switching the first relay, the second relay, the third relay, the fourth relay, the fifth relay and the sixth relay;

the branch switch control unit comprises an isolated DC/DC power supply, a switching control circuit, a step-down filter circuit, a microcontroller circuit, a voltage/current acquisition circuit and an RS485 subunit; wherein the isolated DC/DC power supply is configured for converting a 12V unstable voltage to a 12V stable voltage to form a first power supply and a second power supply, wherein the first power supply powers the switching control circuit, and the second power supply powers the microcontroller circuit after passing through the step-down filter circuit;

the microcontroller circuit is connected to the voltage/current acquisition circuit and the RS485 subunit, respectively, and the microcontroller circuit is configured for monitoring a voltage/current of the primary node and communicating with the communication control module;

an output of the microcontroller circuit is connected to the switching control circuit for controlling switching of branch switches; and the communication conversion interface is configured for establishing a communication between the branch isolation module and the communication control module by using a RS485 protocol.

2. The primary node of the seafloor observatory network based on the constant current power supply of claim 1, wherein the branch isolation module is configured for connecting the primary node in series in the submarine cable of the backbone network, controlling the primary node to access and exit from the backbone network, and receiving the constant current power supply from the shore station; and the power conversion module is configured for converting the constant current power supply output by the branch isolation module into a constant voltage power supply and a plurality of backup constant voltage power supplies to power the communication control module and the external instrument.

3. The primary node of the seafloor observatory network based on the constant current power supply of claim 1, wherein the power conversion module comprises a first constant current to constant voltage power supply and a second constant current to constant voltage power supply, wherein the first constant current to constant voltage power supply and the second constant current to constant voltage power supply are identical with and backup to each other and connected in parallel with each other;

a first bypass circuit is connected at an input end of the first constant current to constant voltage power supply, and a seventh relay is connected in series with a third resistor and then in parallel with a third capacitor to form the first bypass circuit;

a second bypass circuit is connected at an input end of the second constant current to constant voltage power supply, an eighth relay is connected in series with a fourth resistor end then in parallel with a fourth capacitor to form the second bypass circuit;

the first constant current to constant voltage power supply comprises a first power conversion control circuit and a first constant current to constant voltage conversion circuit, a 375V DC constant voltage power supply output by the first constant current to constant voltage power supply supplies power to the communication control module;

under a normal working condition, the first constant current to constant voltage power supply and the second constant current to constant voltage power supply are both in a working state, and when the first constant current to constant voltage power supply fails, the seventh relay is closed, the first constant current to constant voltage power supply is in a short-circuit state, and the second constant current to constant voltage power supply works normally.

4. The primary node of the seafloor observatory network based on the constant current power supply of claim 3, wherein the communication control module internally contains an overvoltage/surge suppression unit, a control unit and a data communication unit, the overvoltage/surge suppression unit is configured for safely processing a power supply voltage output from the power conversion module and then supplying power in a first channel and a second channel to g back-end circuit, wherein the first channel is sent to a medium and low voltage conversion circuit to be converted to a low voltage and then to supply the power to the control unit and the data communication unit, and the second channel supplies the power to the external instrument through a control switch;

the control unit is configured for monitoring information of the internal state of the primary node, controlling a power supply switch of a connection port, and monitoring current and voltage information of an external instrument port;

when a monitoring value exceeds a threshold voltage or a ground fault occurs, a fault interface is immediately closed through a control switch circuit for the fault isolation;

the control unit is further configured for sending state information of a current primary node to the data communication unit, and taking corresponding operations according to received control information of the shore station; and the data communication unit adopts a data backup method to converge data uploaded by the connection port and state data of the primary node obtained by the control unit, sends the data uploaded by the connection port and the state data of the primary node to the shore station via the optical fibers, and receives corresponding control instructions sent by the shore station and then sends the control instructions to the control unit for a response.

5. The primary node of the seafloor observatory network based on the constant current power supply of claim 4, wherein the control unit comprises an RS485 bus switch, an RS485 bus, a first control system board, a second control system board, an inter-integrated circuit (I2C) bus, an I2C bus switch and a plurality of control switches; wherein the first control system board and the second control system board are connected via a serial peripheral interface (SPI) bus;

the RS485 bus switch is in communication with the branch isolation module for monitoring voltage, current, temperature and ballasting information of the primary node;

the first control system board and the second control system board serve as a backup to each other;

when the first control system board is in a working state, the second control system board is in a monitoring state, and both of the first control system board and the second control system board transmit working state information through the SPI bus;

the first control system board in the working state is configured for sending the state information of the current primary node to the data communication unit and receiving the control instructions from the shore station, and the first control system board is further configured for sending a heartbeat signal to the second control system board regularly;

once the second control system board fails to detect the heartbeat signal, the second control system board enters a work switching state, the first control system board is disconnected from the I2C bus and the RS485 bus, the second control system board is connected to the I2C bus and the RS485 bus, the second control system board replaces the first control system board to establish a communication between the external instrument and the branch isolation module and control the external instrument and the branch isolation module through the I2C bus and the RS485 bus, the second control system board transmits fault information to the shore station through the data communication unit and performs relevant fault isolation or repair operations according to the control instructions issued by the shore station, and the second control system board automatically enters the monitoring state and becomes a backup board after the first control system board is repaired;

the I2C bus is configured for establishing a communication between the first control system board, the second control system board and the control switch of the external instrument; and the control switch is configured for controlling an access of the external instrument of the primary node, adopting an IGBT and an electromagnetic relay series connection to control the control switch of the external instrument;

the control switch is further connected to a current, voltage, temperature monitoring circuit to monitor L working state of the external instrument, the control switch timely takes measures for the fault isolation when a power supply state of the connection port is abnormal, and the control switch sends a current state to the shore station for a state monitoring.

6. The primary node of the seafloor observatory network based on the constant current power supply of claim 5, wherein the data communication unit comprises a data backup subunit, two identical data transmission subunits and a wave combining/splitting subunit, wherein each of the two identical data transmission subunits comprises a switch and a photoelectric converter;

the data uploaded by the external instrument are transmitted to the two switches, respectively after a 1:1 backup by the data backup subunit, and the data uploaded by the external instrument are converted photoelectrically and then enter the wave combining/splitting subunit for wave combining, and an optical signal after the wave combining is sent to the shore stations at two ends simultaneously.

7. The primary node of the seafloor observatory network based on the constant current power supply of claim 6, wherein when the branch isolation module obtains, through a communication interface of the communication control module, that the working state of the primary node is abnormal or the communication between the branch isolation module and the communication control module fails, or when the branch isolation module detects, through the voltage/current acquisition circuit, that the electric energy consumed by the current primary node is abnormal, the branch isolation module actively cuts off electrical energy supply to the current primary node, and a current on the submarine cable of the backbone network is switched to the first relay and the second relay to disconnect a connection between the current primary node and the submarine cable of the backbone network; and when a bypass relay of the power conversion module is closed, an internal power conversion module of the primary node is in a short-circuit state, once an electric energy consumption of the current primary node is detected as zero through the voltage/current acquisition circuit, the branch isolation module actively closes the first relay and the second relay, and the branch isolation module cuts off supply of the electric energy from the submarine cable to the primary node.

8. The primary node of the seafloor observatory network based on the constant current power supply of claim 7, wherein a first primary node and a second primary node are connected in series with each other, when a short circuit or a low resistance fault occurs between the submarine cable connected to the first primary node and the seawater, data communication units within communication control modules of the first primary node and the second primary node each receive a switching instruction sent by the shore station to implement the fault isolation, then the data communication units send the switching instruction to the control unit, and the control unit then transmits the switching instruction to the branch isolation module through the RS485 bus switch, the fourth relay in the first primary node is firstly closed, and a backbone network current on a left side of a fault point passes through the fourth relay to form a first loop, an instantaneous discharge current generated by a distributed capacitor between the submarine cable and a seawater ground is absorbed by the first absorption resistor, and when a discharge is finished, the first absorption resistor is in a short-circuit state through closing the third relay, and the fourth relay is controlled to be disconnected;

the sixth relay of the second primary node is closed, and a backbone network current on a right side of the fault point passes through the sixth relay to form a second loop, and the instantaneous discharge current generated by the distributed capacitor between the submarine cable of the backbone network and the seawater ground is absorbed by the second absorption resistor, and after the discharge is finished, the second absorption resistor is in a short-circuit state through closing the fifth relay, and the sixth relay is controlled to be disconnected.

* * * * *